US012294141B2

(12) United States Patent
Pollayi et al.

(10) Patent No.: US 12,294,141 B2
(45) Date of Patent: May 6, 2025

(54) ANTENNA CALIBRATION BOARDS HAVING NON-UNIFORM COUPLER SECTIONS

(71) Applicant: Outdoor Wireless Networks LLC, Claremont, NC (US)

(72) Inventors: Lakshminarayana Pollayi, Srikakulam (IN); Kumara Swamy Kasani, Godavarikhani (IN); Ligang Wu, Suzhou (CN)

(73) Assignee: Outdoor Wireless Networks LLC, Claremont, NC (US)

( * ) Notice: Subject to any disclaimer, the term of this patent is extended or adjusted under 35 U.S.C. 154(b) by 177 days.

(21) Appl. No.: 17/820,904

(22) Filed: Aug. 19, 2022

(65) Prior Publication Data

US 2023/0082093 A1 Mar. 16, 2023

(30) Foreign Application Priority Data

Sep. 14, 2021 (IN) ............................ 202141041262

(51) Int. Cl.

| | |
|---|---|
| ***H01Q 1/24*** | (2006.01) |
| ***H01Q 19/10*** | (2006.01) |
| ***H01Q 21/00*** | (2006.01) |
| ***H01Q 21/06*** | (2006.01) |
| ***H01Q 21/26*** | (2006.01) |

(52) U.S. Cl.

CPC ............ *H01Q 1/246* (2013.01); *H01Q 19/10* (2013.01); *H01Q 21/0006* (2013.01); *H01Q 21/061* (2013.01); *H01Q 21/26* (2013.01)

(58) Field of Classification Search

CPC ... H01Q 3/36; H01Q 3/26; H01Q 3/28; H01P 5/222; H01P 5/227

See application file for complete search history.

(56) References Cited

U.S. PATENT DOCUMENTS

| | | | | |
|---|---|---|---|---|
| 4,928,078 A * | 5/1990 | Khandavalli | ........... | H01P 5/227 333/116 |
| 10,812,200 B2 | 10/2020 | Li et al. | | |
| 2018/0316092 A1 | 11/2018 | Cai et al. | | |
| 2020/0411943 A1* | 12/2020 | Nguyen | .................... | H01P 3/08 |
| 2021/0005957 A1* | 1/2021 | Han | ........................ | H01Q 3/36 |

FOREIGN PATENT DOCUMENTS

| | | | | |
|---|---|---|---|---|
| CN | 108417961 A | 8/2018 | | |
| CN | 110085986 A * | 8/2019 | ............... | H01Q 1/38 |
| KR | 102137019 B1 | 7/2020 | | |

OTHER PUBLICATIONS

Notification of Transmittal of the International Search Report and the Written Opinion of the International Searching Authority, or the Declaration, in corresponding PCT Application No. PCT/US2022/075304 (Dec. 16, 2022).

* cited by examiner

*Primary Examiner* — Dimary S Lopez Cruz
*Assistant Examiner* — Aladdin Abdulbaki
(74) *Attorney, Agent, or Firm* — Myers Bigel, P.A.

(57) ABSTRACT

Base station antenna calibration boards are provided. A base station antenna calibration board includes directional couplers and radio frequency (RF) transmission lines that are coupled to the directional couplers, respectively. Moreover, a first pair of the directional couplers has a coupler section that is between and coupled to a first pair of the RF transmission lines and that has a non-rectangular interior shape. Related base station antennas are also provided.

20 Claims, 6 Drawing Sheets

ANTENNA CALIBRATION BOARDS HAVING NON-UNIFORM COUPLER SECTIONS

CROSS-REFERENCE TO RELATED APPLICATION

The present application claims priority to Indian Provisional Patent Application No. 202141041262, filed Sep. 14, 2021, the entire content of which is incorporated herein by reference.

BACKGROUND

The present invention generally relates to radio communications and, more particularly, to base station antennas for cellular communications systems.

Cellular communications systems are well known in the art. In a cellular communications system, a geographic area is divided into a series of regions or "cells" that are served by respective base stations. Each base station may include one or more base station antennas that are configured to provide two-way radio frequency ("RF") communications with subscribers that are within the cell served by the base station. In many cases, each base station is divided into "sectors," In one common configuration, a hexagonally-shaped cell is divided into three 120° sectors in the azimuth plane, and each sector is served by one or more base station antennas that have an azimuth Half Power Beamwidth ("HPBW") of approximately 65°, Typically, the base station antennas are mounted on a tower or other raised structure, with the radiation patterns that are generated by the base station antennas directed outwardly. Base station antennas are often implemented as linear or planar phased arrays of radiating elements.

To increase capacity, base station antennas that include beamforming arrays and/or that are configured to operate with multi-input-multi-output ("MIMO") radios have been introduced in recent years. A beamforming array refers to an antenna array that includes multiple columns of radiating elements. Beamforming arrays can generate antenna beams having reduced (narrower) beamwidths in, for example, the horizontal or "azimuth" plane, which increases the directivity or "gain" of the antenna, thereby increasing the supportable throughput. MIMO refers to a communication technique in which a data stream is broken into pieces that are simultaneously transmitted using certain coding techniques over multiple relatively uncorrelated transmission paths between a transmitting station and a receiving station. Multi-column antenna arrays may be used for MIMO transmissions, where each column in the array may be connected to a port of a MIMO radio and used to transmit/receive one of the multiple data streams. In practice, as orthogonal polarizations tend to be highly uncorrelated, the radiating elements in a MIMO array are typically implemented as dual-polarized radiating elements, allowing each column in the MIMO array to be connected to two ports on the radio (where the first port is connected to the first-polarization radiators of the radiating elements in the column, and the second port is connected to the second-polarization radiators of the radiating elements in the column). This technique can effectively halve the number of columns of radiating elements required, as each physical column of the array contains two independent columns of radiators.

MIMO and beamforming techniques can also be combined. For example, so-called 8-Transmit/8-Receive ("8T8R") radios (which include eight radio ports) are now routinely connected to antenna arrays that include four columns of dual-polarized radiating elements that are configured to form a single antenna beam per polarization within a sector. The two polarizations may be used to implement 2×MIMO communications for each antenna beam. These beamforming antennas are typically used for time division duplex ("TDD") communications and may generate a single antenna beam (at each polarization) during each individual time slot of the TDD communication scheme. Likewise, 16-Transmit/16-Receive ("16T16R") radios (which include sixteen radio ports) are known in the art that are connected to antenna arrays that include eight columns of dual-polarized radiating elements that are configured to form one or more antenna beams (per polarization) at a time within a sector. The 16T16R solutions provide higher gain and less interference (and hence support higher data throughput) as compared to the 8T8R solution, but also require a larger array on the antenna and a much more expensive 16T16R radio, which can significantly increase cost.

Beamforming antennas are also available that are capable of forming narrow antenna beams that are sometimes referred to as "pencil beams" that can be pointed at specific users or closely clustered groups of users. These antennas can generate different pencil beams on a time-slot by time-slot basis so that very-high-gain antenna beams can be electronically steered throughout a sector during different time slots to provide coverage to the users throughout the sector.

Unfortunately, the relative amplitude and phases applied by the radio to the sub-components of the RF signal that are passed to each column of a beamforming antenna may not be maintained as the sub-components of the RF signal are passed from the radio to a high-power amplifier and then on to the base station antenna. If the relative amplitudes and phases change, then the resulting antenna beam will typically exhibit lower antenna gains in desired directions and higher antenna gains in undesired directions, resulting in degraded performance. Variations in the relative amplitudes and phases may arise, for example, because of non-linearities in the amplifiers that are used to amplify the respective transmitted and received signals, differences in the lengths of the cabling connections between the different radio ports and respective RF ports on the antenna, variations in temperature, and the like. While some of the causes for the amplitude and phase variations may tend to be static (i.e., they do not change over time), others may be dynamic, and hence more difficult to compensate.

To reduce the impact of the above-discussed amplitude and phase variations, beamforming base station antennas may include a calibration circuit that samples each sub-component of an RF signal and passes these samples back to the radio. The calibration circuit may comprise a plurality of directional couplers, which are configured to tap RF energy from respective RF transmission paths that extend between the RF ports and the columns of radiating elements, as well as a calibration combiner that is used to combine the RF energy tapped off of each of these RF transmission paths. The output of the calibration combiner is coupled to a calibration port on the antenna, which in turn is coupled back to the radio. The radio may use the samples of each sub-component of the RF signal to determine the relative amplitude and/or phase variations along each transmission path, and may then adjust the applied amplitude and phase weights to account for these variations.

SUMMARY

Pursuant to embodiments of the present invention, a base station antenna may include a plurality of radiating elements that are in a plurality of columns. Moreover, the base station antenna may include a calibration port and a calibration board. The calibration board may include a plurality of directional couplers that are each coupled to the calibration port. The calibration board may include a plurality of RF transmission paths that are coupled to the directional couplers, respectively, and to the columns. A first pair of the directional couplers may have a coupler section that is between and coupled to a first pair of the RF transmission paths and that has a non-rectangular interior shape.

In some embodiments, the non-rectangular interior shape may include a plurality of tapered portions of the first pair of the directional couplers. For example, the tapered portions may include first and second tapered portions that are adjacent a first RF transmission path of the first pair of the RF transmission paths. Moreover, the tapered portions may include third and fourth tapered portions that are adjacent a second RF transmission path of the first pair of the RF transmission paths.

According to some embodiments, the first and second tapered portions may be mirror symmetrical. Moreover, the third and fourth tapered portions may be mirror symmetrical.

In some embodiments, the first and third tapered portions may be mirror symmetrical. Moreover, the second and fourth tapered portions may be mirror symmetrical.

According to some embodiments, the first and second tapered portions may be tapered toward each other. Moreover, the third and fourth tapered portions may be tapered toward each other.

In some embodiments, at least one of the first, second, third, or fourth tapered portions may be a stepped portion.

According to some embodiments, the coupler section may be a trace of the calibration board.

In some embodiments, the calibration board may include a grounded coplanar waveguide that is between the first pair of the RF transmission paths and adjacent a first end of the coupler section.

According to some embodiments, the calibration board may include an RF port that is coupled to a first RF transmission path of the first pair of the RF transmission paths. Moreover, the calibration board may include a grounded coplanar waveguide that extends alongside the RF port.

In some embodiments, the calibration board may include a plurality of calibration combiners that are coupled between the directional couplers and the calibration port. Moreover, the coupler section of the first pair of the directional couplers may be coupled to a first of the calibration combiners.

A base station antenna, according to some embodiments, may include an antenna array including a plurality of radiating elements. The base station antenna may include a calibration port and a calibration board. Moreover, the calibration board may include a plurality of directional couplers that are coupled to the calibration port, a plurality of RF transmission paths that are coupled to the directional couplers, respectively, and to the antenna array, and a first grounded planar waveguide that is adjacent a first end of a first of the RF transmission paths.

In some embodiments, the calibration board may include a second grounded planar waveguide that is adjacent a first end of a second of the RF transmission paths. The calibration board may include a third grounded planar waveguide that is between the first and the second of the RF transmission paths and adjacent a first of the directional couplers. Moreover, the first of the directional couplers may have a tapered coupling line that is coupled to the first of the RF transmission paths, and the first, second, and third grounded planar waveguides may be first, second, and third grounded coplanar waveguides, respectively.

A base station antenna calibration board, according to some embodiments, may include a calibration port. The base station antenna calibration board may include a plurality of directional couplers that are coupled to the calibration port. Moreover, the base station antenna calibration board may include a plurality of RF transmission paths that are coupled to the directional couplers, respectively. A first of the directional couplers may include a first tapered portion that is coupled to a first of the RF transmission paths. A second of the directional couplers may include a second tapered portion that is coupled to a second of the RF transmission paths. The first tapered portion and the second tapered portion may be opposite each other between the first and the second of the RF transmission paths.

In some embodiments, the first of the directional couplers may include a third tapered portion that is tapered toward the first tapered portion and is coupled to the first of the RF transmission paths. The second of the directional couplers may include a fourth tapered portion that is tapered toward the second tapered portion and is coupled to the second of the RF transmission paths. Moreover, the third tapered portion and the fourth tapered portion may be opposite each other between the first and the second of the RF transmission paths.

DETAILED DESCRIPTION

Pursuant to embodiments of the present invention, base station antenna calibration boards are provided. Conventional base station antenna calibration boards have a coupler section that includes a uniform coupling line, which can exacerbate amplitude and phase differences between RF ports and a calibration port of a calibration board by limiting the directivity of the calibration board. Calibration boards according to embodiments of the present invention, however, may include a non-uniform coupler section, which can increase the directivity of a calibration board. For example, the non-uniform coupler section may comprise non-uniform coupling lines of a pair of directional couplers, respectively, of a calibration board, and this non-uniform shape of the coupling lines may increase the directivity of the directional couplers. Moreover, the calibration boards according to embodiments of the present invention may include grounded planar waveguides that improve impedance matching.

As used herein with respect to a directional coupler on a calibration board, the term "directivity" refers to the difference between (a) the amount of RF energy transferred by the directional coupler to a calibration port of the calibration board and (b) RF energy from an output RF port of the calibration board (e.g., energy reflected by a port adjacent the directional coupler) to the calibration port. Increasing the directivity of the directional coupler thus means that the directional coupler provides required/sufficient energy to the calibration port while the calibration port is simultaneously isolated from energy that is reflected by the output RF port.

Embodiments of the present invention will now be discussed in greater detail with reference to the attached figures.

Figure 1:
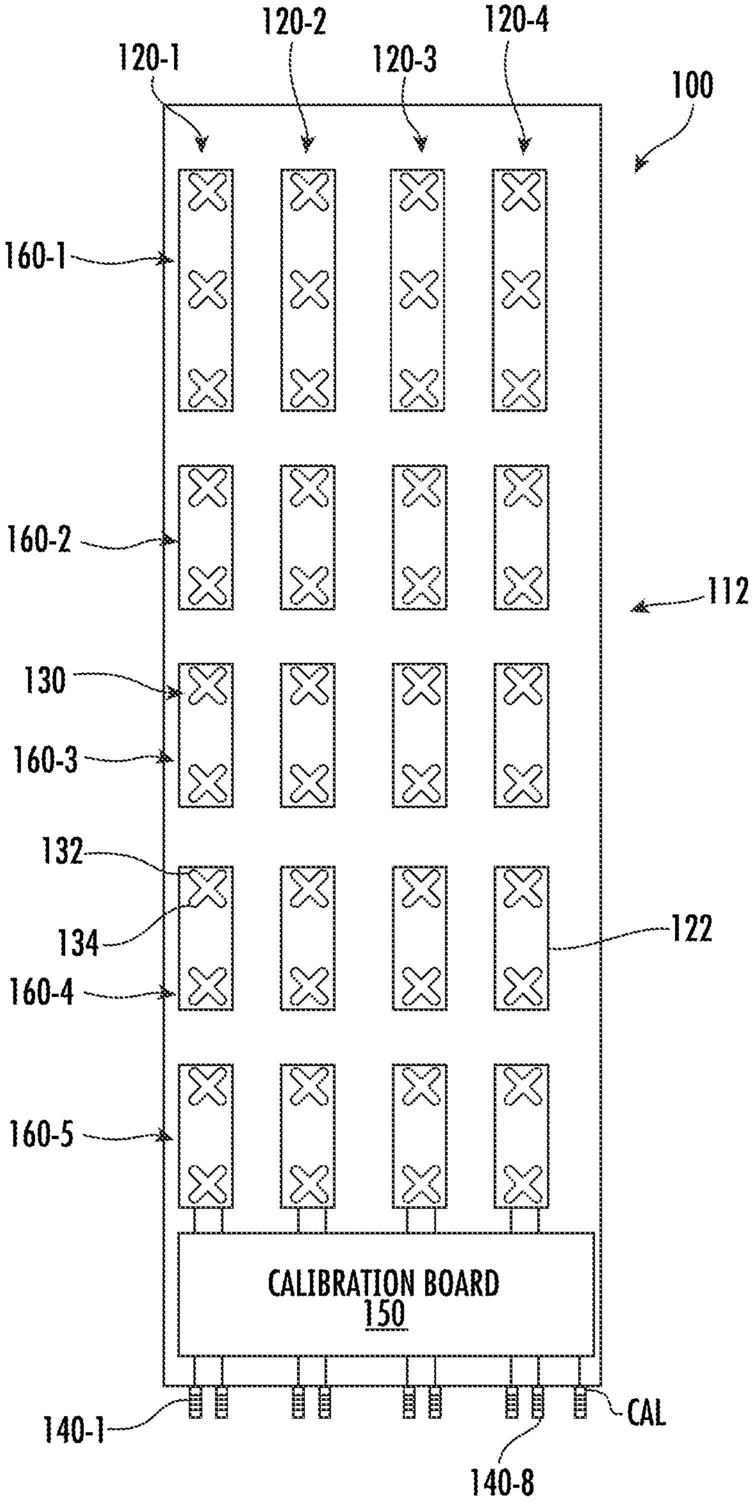
FIG. 1 is a schematic front view of an antenna that includes a calibration board and an antenna array that includes tour columns of dual-polarized radiating elements.

FIG. 1 is a schematic front view of an antenna 100 that includes a calibration hoard 150 and an antenna array 112 that includes four columns 120-1 through 120-4 of radiating elements 130. The radiating elements 130 may be dual-polarized radiating elements so that the multi-column antenna array 112 may generate antenna beams at each polarization. Each radiating element 130 may comprise, for example, a crossed-dipole radiating element that includes a first dipole radiator 132 and a second dipole radiator 134 that crosses/intersects the first dipole radiator 132. The dipole radiators 132 and 134 each have two dipole "arms." Each column 120 includes one or more groups 122 (e.g., one or more sub-arrays) of radiating elements 130. As shown in FIG. 1, the antenna array 112 includes five rows 160-1 through 160-5 of the groups 122.

The array of columns 120 may be inside a radome of the antenna 100. For simplicity of illustration, the radome is omitted from view in FIG. The antenna 100 may include RF ports 140-1 through 140-8, which may also be referred to herein as "connectors" or "antenna signal ports," that are coupled (e.g., electrically connected) to the columns 120. The antenna signal ports 140 may also be coupled to respective radio signal ports of a radio by respective RF transmission lines, such as coaxial cables. For example, the radio may be a TDD beamforming radio for a cellular base station, and the antenna and the radio may be located at (e.g., may be components of) a cellular base station. For simplicity of illustration, the radio and the RF transmission lines that extend between the radio and the antenna signal ports 140 are omitted from view in FIG. 1.

In some embodiments, the radio may be an 8T8R radio, and thus may include eight RF ports that pass RF communication signals between the internal components of the radio and the antenna array 112. These ports may also be referred to herein as "radio signal ports." For example, half (i.e., four) of the radio signal ports may be first-polarization ports and another half of the radio signal ports may be second-polarization ports, where the first and second polarizations are different polarizations. The radio may also include one or more calibration ports that are not radio signal ports, but instead are ports that may be used in calibrating the internal circuitry of the radio to account for amplitude and/or phase differences between the RF signal paths external to the radio.

Though the example antenna 100 has four columns 120 and five rows 160, antennas according to the present invention may, in some embodiments, include more or fewer columns 120 and/or rows 160. Likewise, the 8T8R radio that is discussed with respect to the antenna 100 is merely an example, and antennas according to the present invention may be coupled to a radio that has more or fewer radio signal ports than the 8T8R radio.

Figure 2A:
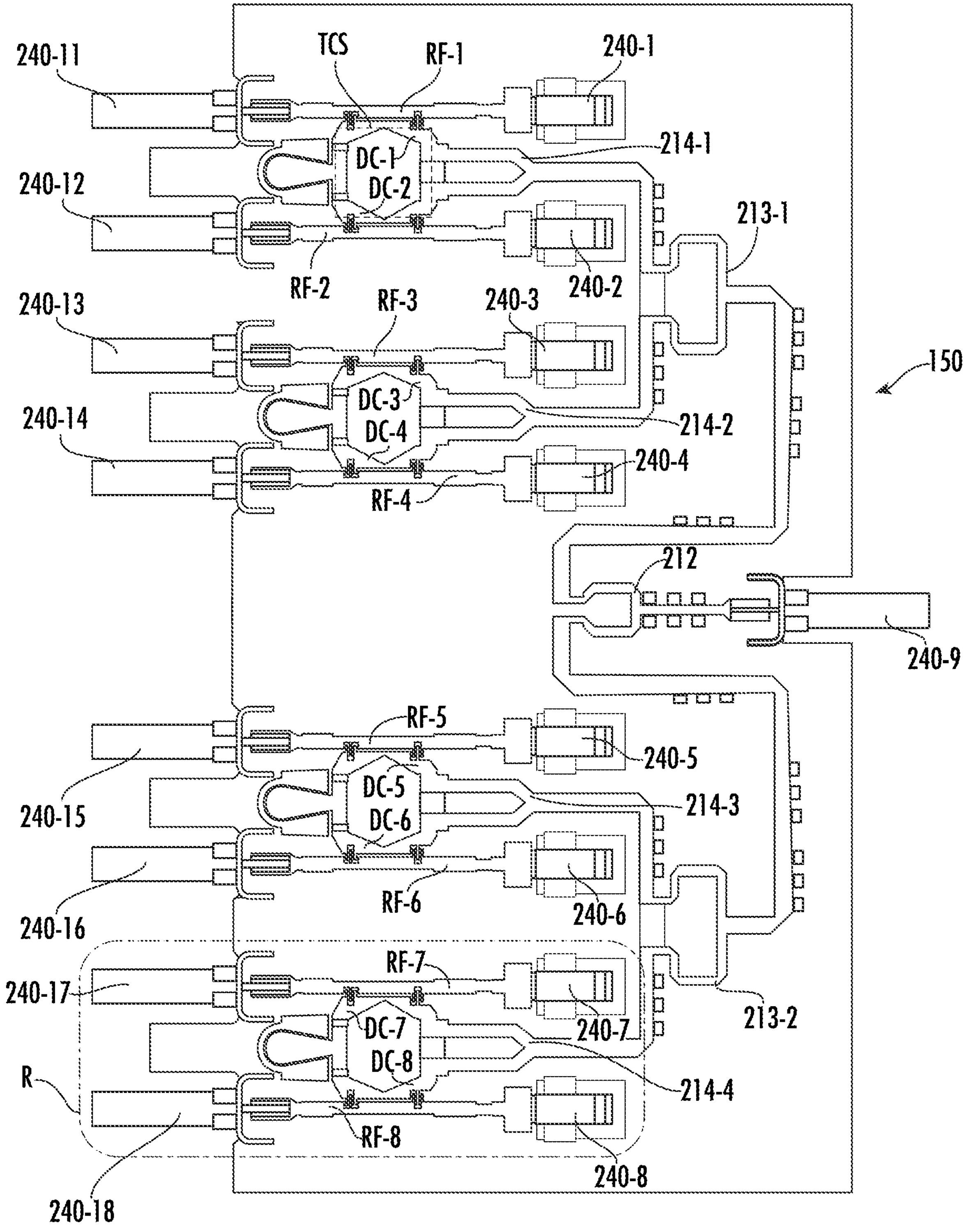
FIG. 2A is a plan view of the calibration board of FIG. 1 according to embodiments of the present invention.

FIG. 2A is a plan view of the calibration board 150 of FIG. 1 according to embodiments of the present invention. The calibration board 150 is a calibration circuit having a plurality of directional couplers DC-1 through DC-8 and a plurality of RF transmission paths RF-1 through RF-8. Each directional coupler DC is adjacent, and configured to tap RF energy from, a respective one of the paths RF. For example, the directional couplers DC-1 through DC-8 may be in parallel with, and coupled (e.g., electromagnetically coupled) to, the paths RF-1 through RF-8, respectively.

The calibration board 150 also includes calibration combiners 212, 213, 214. Pairs of the directional couplers DC are each coupled to a respective combiner 214 that combines the outputs of its coupler pair. The combiners 214 are coupled to a calibration port 240-9 of the calibration board 150 via two further tiers of combiners 212, 213. Accordingly, the calibration board 150 includes four first-tier combiners 214-1 through 214-4, two second-tier combiners 213-1, 213-2, and a single third-tier combiner 212. Examples of calibration circuits having combiners and directional couplers are discussed in U.S. Pat. No. 10,812,200, the entire content of which is incorporated herein by reference.

In some embodiments, the calibration board 150 may further include a bias tee that is coupled to the calibration port 240-9. For simplicity of illustration, however, bias-tee features are omitted from view in FIG. 2A.

The calibration board 150 may be a printed circuit board ("PCB") having traces on a main surface thereof. For example, the directional couplers DC-1 through DC-8, the paths RF-1 through RF-8, and the combiners 212-214 may each be implemented as copper, or other metal, traces on a front surface 200F (FIG. 3) of a substrate 201 (FIG. 2B) of the calibration board 150.

Moreover, the calibration board 150 may have eight RF ports 240-1 through 240-8 that are coupled to the antenna signal ports 140-1 through 140-8 (FIG. 1), respectively, of the antenna 100 (FIG. 1) by respective RF transmission lines, such as coaxial cables. The calibration board 150 may also have eight RF ports 240-11 through 240-18 that are coupled to the antenna array 112 (FIG. 1) by respective coaxial cables (or other RF transmission lines). For example, the ports 240-11 through 240-18 may include four first-polarization ports that are coupled to the columns 120-1 through 120-4 (FIG. 1) of radiating elements 130 (FIG. 1), respectively, and four second-polarization ports that are coupled to the respective columns 120-1 through 120-4. As shown in FIG. 2A, the ports 240-1 through 240-8 are coupled to the ports 240-11 through 240-18, respectively, by the paths RF-1 through RF-8, respectively, that are on the calibration board 150.

Pairs of the paths RF-1 through RF-8 may each have a respective pair of the directional couplers DC-1 through DC-8 therebetween. As an example, FIG. 2A illustrates a first pair of directional couplers DC-1, DC-2 collectively having a tapered coupler section TCS that is between and coupled to the two paths RF-1, RF-2. A second pair of directional couplers DC-3, DC-4 may likewise collectively have a tapered coupler section TCS that is between and coupled to the two paths RF-3, RF-4. Similarly, a third pair of directional couplers DC-5, DC-6 may collectively have a tapered coupler section TCS that is between and coupled to the two paths RF-5, RF-6. Moreover, a fourth pair of directional couplers DC-7, DC-8 may collectively have a tapered coupler section TCS that is between and coupled to the two paths RF-7, RF-8. The tapered coupler section TCS of the directional couplers DC-7, DC-8 is in a region R of the calibration board 150 that is discussed in more detail with respect to FIG. 2B.

Figure 2B:
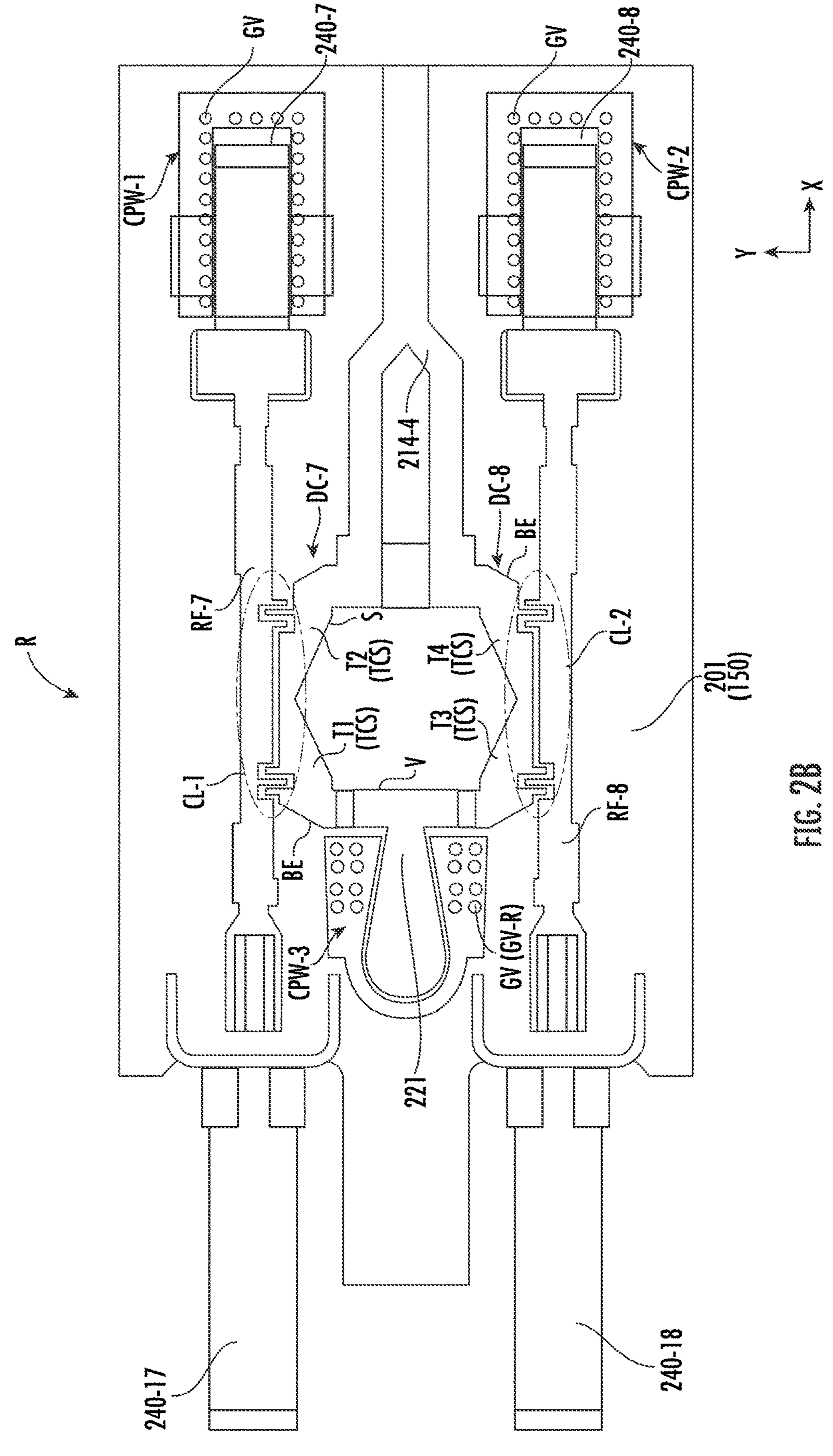
FIG. 2B is an enlarged view of a region of the calibration board of FIG. 2A that includes a tapered coupler section.

FIG. 2B is an enlarged view of the region R of the calibration board 150 of FIG. 2A. As shown in FIG. 2B, the tapered coupler section TCS in the region R includes first and second tapered portions T1, T2 of the directional coupler DC-7 and third and fourth tapered portions T3, T4 of the directional coupler DC-8. The first and second tapered portions T1, T2 are adjacent, and coupled to, the path RF-7, and the third and fourth tapered portions T3, T4 are adjacent, and coupled to, the path RF-8. As used herein, the term "coupler section" refers to portions of a pair of directional couplers DC that are between and coupled to respective paths RF. This term does not encompass beveled outer edges BE of the directional couplers DC. The beveled outer edges BE may, in some embodiments, extend outward in the direction X beyond interior surfaces S, V of the tapered coupler section TCS and/or beyond interdigitating teeth of comb-line features CL, which are discussed in greater detail below.

In some embodiments, the first and second tapered portions T1, T2 may be tapered toward each other along a direction X, and the third and fourth tapered portions T3, T4 may be tapered toward each other along the direction X. As a result, respective sloped surfaces S of the first and second tapered portions T1, T2 may converge, and respective sloped surfaces S of the third and fourth tapered portions T3, T4 may converge. A respective tapered coupling line of each directional coupler DC may thus be thinner in its middle and wider at its ends, such that the tapered coupling line decreases in width from a first end to the middle and then increases in width from the middle to an opposite (in the direction X), second end. The sloped surfaces S of the first and second tapered portions T1, T2 may be opposite (e.g., may face) the sloped surfaces S of the third and fourth tapered portions T3, T4. Moreover, the tapered portions T1-T4 may taper linearly and/or non-linearly. Accordingly, the sloped surfaces S of the tapered portions T1-T4 may be (a) straight, (b) curved, or (c) a combination of straight and curved.

For example, the first and second tapered portions T1, T2 may be mirror symmetrical about an axis that extends in a direction Y that is perpendicular to the direction X. The third and fourth tapered portions T3, T4 may likewise be mirror symmetrical about the axis that extends in the direction Y. Moreover, the first and third tapered portions T1, T3 may be mirror symmetrical about an axis that extends in the direction X, and the second and fourth tapered portions T2, T4 may be mirror symmetrical about the axis that extends in the direction X. Respective sloped surfaces S of the tapered portions T1-T4 may thus have equal-magnitude slopes in the X-Y plane that is shown in FIG. 2B.

The tapered coupler section TCS is not limited, however, to tapered portions T1-T4 that are mirror images of each other. Rather, the tapered portions T1-T4 may, in some embodiments, be asymmetrical about the axis that extends in direction X and/or about the axis that extends in the direction Y. As an example, the second tapered portion T2 have a different-magnitude slope (i.e., a faster or slower taper) from that of the first tapered portion T1 and/or the fourth tapered portion T4.

Compared with a conventional uniform (e.g., rectangular) coupler section, the tapered coupler section TCS can increase the directivity of the directional couplers DC-7, DC-8 over a wide band of frequencies. Moreover, according to some embodiments, the path RF-7 and the directional coupler DC-7 may be coupled to each other via a comb-line feature CL-1. The comb-line feature CL-1, which may include interdigitating teeth of the path RF-7 and the directional coupler DC-7, can help to further increase the directivity of the directional coupler DC-7. As an example, the comb-line feature CL-1 may include first and second sets of interdigitating teeth, and respective sloped surfaces S of the first and second tapered portions T1, T2 of the directional coupler DC-7 may converge between the first and second sets of interdigitating teeth. Each set of interdigitating teeth may include three or more teeth that protrude in the direction Y, such as one tooth protruding from the path RF-7 and two teeth protruding from the directional coupler DC-7 or vice versa.

The path RF-8 and the directional coupler DC-8 may be coupled to each other via a comb-line feature CL-2. The comb-line feature CL-2, like the comb-line feature CL-1, may include interdigitating teeth and can help to further increase the directivity of the directional coupler DC-8.

The directional couplers DC-7, DC-8 may share a radial (e.g., fan-shaped) stub 221 that is between end portions of the paths RF-7, RF-8. The stub 221 may thus be a part of each of the directional couplers DC-7, DC-8. In some embodiments, the stub 221 may provide RF (but not direct current ("DC")) grounding for the directional couplers DC-7, DC-8. Moreover, the stub 221 and the tapered portions T1-T4 may each be traces on a substrate 201 of the calibration board 150.

The substrate 201 may also have grounded vias GV therein. For example, a first group of grounded vias GV may extend alongside the port 240-7 that is at an end of the path RF-7, and a second group of grounded vias GV may extend alongside the port 240-8 that is at an end of the path RF-8. As an example, each group may include two rows of ten grounded vias GV in the direction X and a column of five grounded vias GV in the direction Y. In some embodiments, each group may be a part of a respective grounded coplanar waveguide CPW (or, alternatively, of a respective grounded planar waveguide having a single conductive line). A first grounded coplanar waveguide CPW-1 that extends alongside the port 240-7 may improve impedance matching for the port 240-7. Similarly, a second grounded coplanar waveguide CPW-2 that extends alongside the port 240-8 may improve impedance matching for the port 240-8.

According to some embodiments, the substrate 201 may include a third grounded coplanar waveguide CPW-3 between the paths RF-7, RF-8 and adjacent the directional couplers DC-7, DC-8. For example, the third grounded coplanar waveguide CPW-3 may have four rows GV-R of four grounded vias GV, where each row GV-R extends in the direction X alongside the radial stub 221. As an example, the stub 221 may extend in the direction X between first and second pairs of the rows GV-R. The structure of the third grounded coplanar waveguide CPW-3 is discussed in more detail with respect to FIG. 3. The presence of the third grounded coplanar waveguide CPW-3 adjacent the stub 221 can improve amplitude and phase performance of the calibration board 150 over a wide band of frequencies by inhibiting the stub 221 from radiating. For example, the coplanar waveguide CPW-3 can reduce amplitude and phase differences between the RF ports 240-1 through 240-8 (FIG. 2A) and the calibration port 240-9 (FIG. 2A) of the calibration board 150.

Figure 2C:
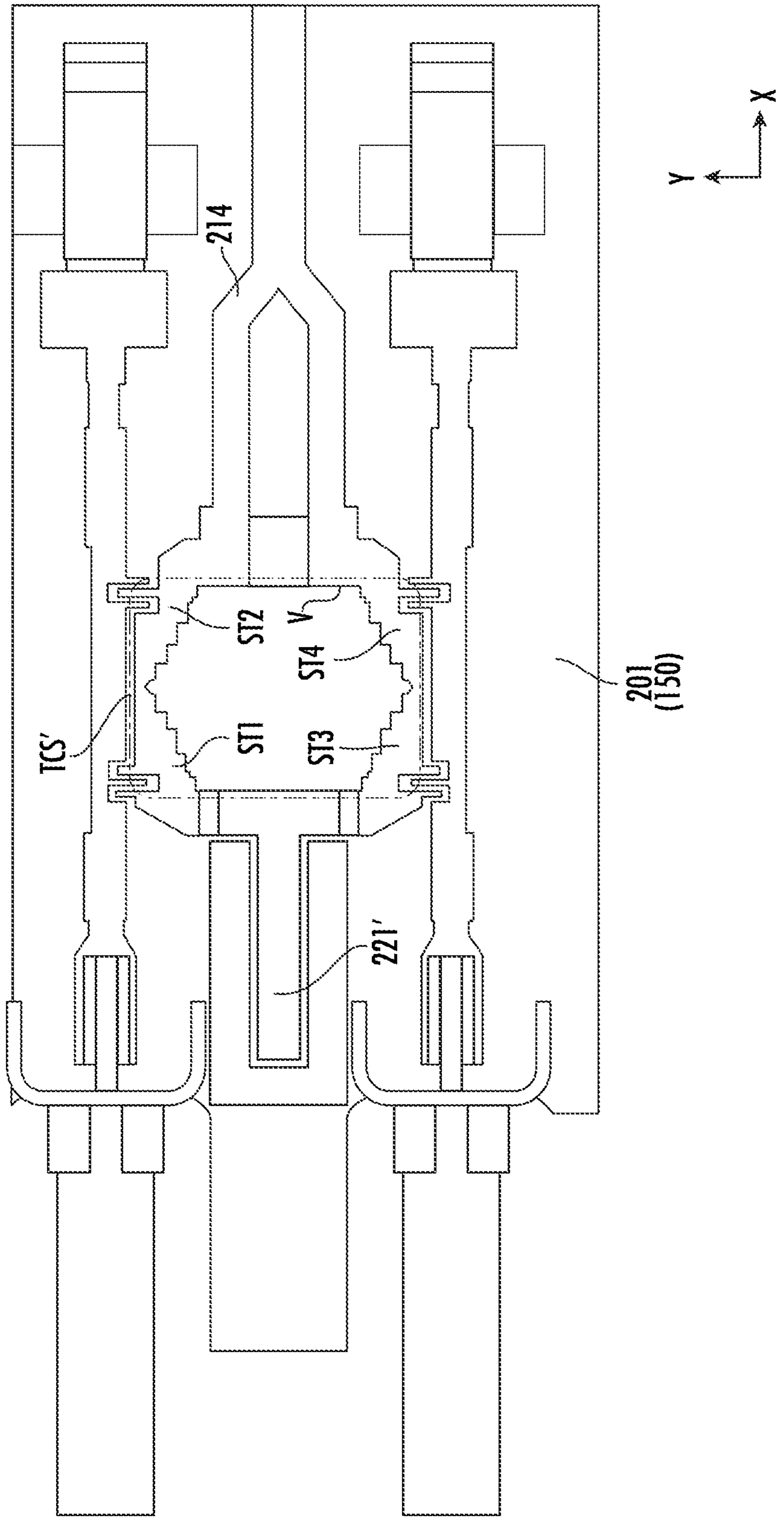
FIG. 2C is a plan view of a tapered coupler section according to further embodiments.

FIG. 2C is a plan view of a tapered coupler section TCS' according to further embodiments. For simplicity of illustration, grounded coplanar waveguides CPW (FIG. 2B) are omitted from view in FIG. 2C. Moreover, the radial stub 221 (FIG. 2B) is replaced with a stub 221' having a rectangular portion that protrudes in the direction X. Either of the different types of stubs 221, 221', however, may be used with either of the tapered coupler sections TCS, TCS'.

Compared with respective smooth sloped surfaces S of the tapered portions T1-T4 of the tapered coupler section TCS that is shown in FIG. 2B, the tapered coupler section TCS' of FIG. 2C includes four stepped (or jagged/rough) tapered portions ST1-ST4. The tapered coupler sections TCS, TCS' can each increase the directivity of the calibration board 150 relative to a uniform coupler section. For example, the tapered coupler sections TCS, TCS' can increase the directivity by improving impedance matching, such as by reducing coupling between the RF ports 240-11 through 240-18 (FIG. 2A) and the calibration port 240-9 (FIG. 2A) of the calibration board 150.

The stepped tapered portions ST1-ST4 of the tapered coupler section TCS' may shift the frequencies at which the directivity of the calibration board 150 is the highest, relative to the tapered portions T1-T4 of the tapered coupler section TCS. For example, the stepped tapered portions ST1-ST4 may result in higher directivity than the tapered portions T1-T4 at frequencies above 3.6 or 3.7 gigahertz ("GHz"). Conversely, the tapered portions T1-T4 may result in higher directivity than the stepped tapered portions ST1-ST4 at frequencies below 3.6 or 3.7 GHz.

In some embodiments, the stepped tapered portions ST1-ST4 may be combined with the tapered portions T1-T4. For example, the stepped tapered portions ST3, ST4 of the tapered coupler section TCS' may be replaced with the tapered portions T3, T4 of the tapered coupler section TCS. As another example, the stepped tapered portions ST2, ST4 may be replaced with the tapered portions T2, T4. Further examples include replacing the stepped tapered portions ST1, ST2 with the tapered portions T1, T2, or replacing the stepped tapered portions ST1, ST3 with the tapered portions T1, T3. At least one of the tapered portions T1-T4 may thus be replaced with a corresponding one of the stepped tapered portions ST1-ST4. Accordingly, any combination of the stepped tapered portions ST1-ST4 and the tapered portions T1-T4 may be selected, where different combinations may shift the frequencies at which the directivity of the calibration board 150 is the highest.

Figure 2D:
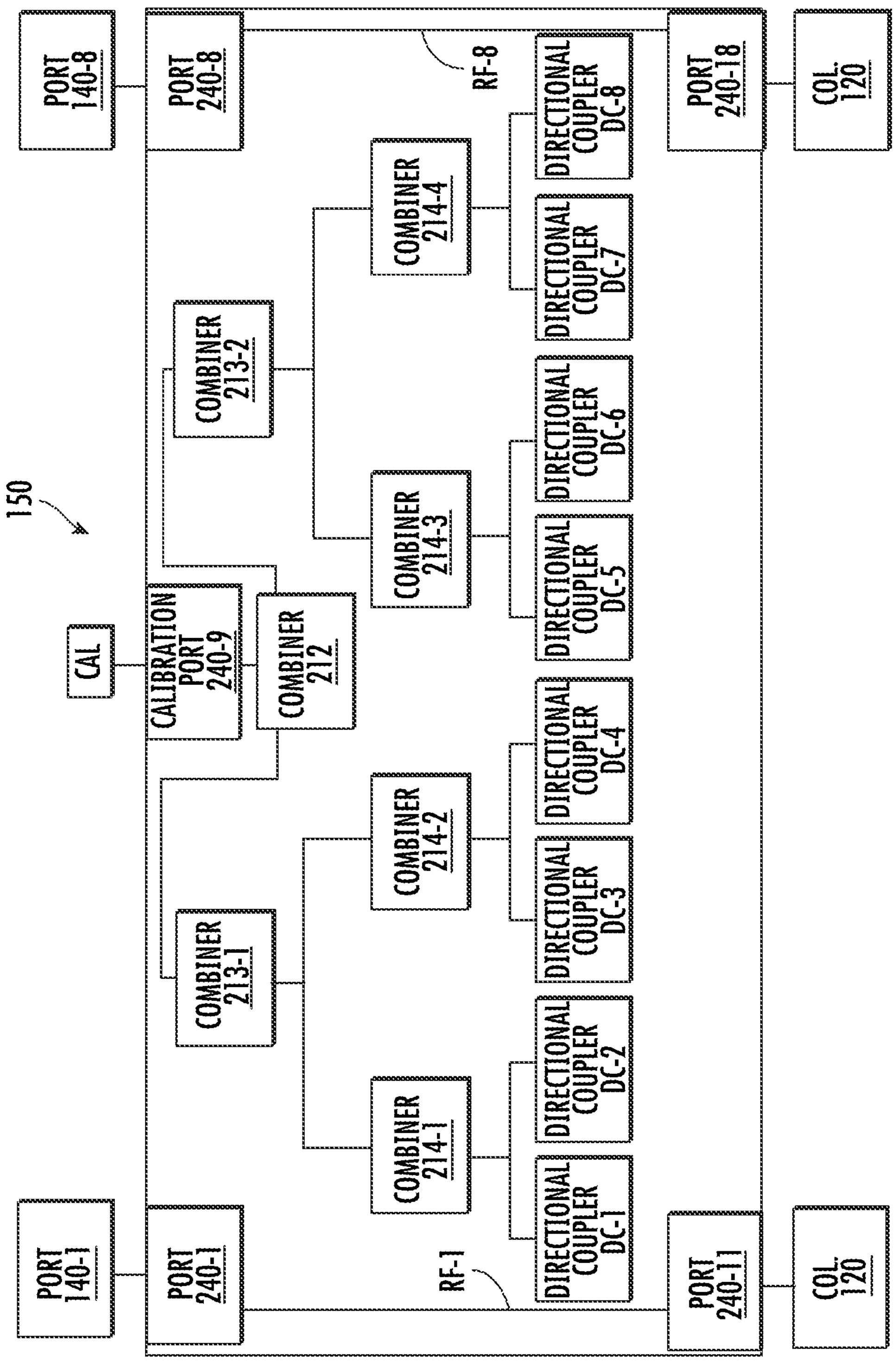
FIG. 2D is a schematic block diagram illustrating connections between the directional couplers of FIG. 2A and a calibration port of the antenna of FIG. 1.

FIG. 2D is a schematic block diagram illustrating connections between the directional couplers DC of FIG. 2A and a calibration port CAL of the antenna 100 of FIG. 1. The calibration board 150 includes eight directional couplers DC-1 through DC-8 that are coupled to a calibration port 240-9 that couples the calibration board 150 to the calibration port CAL of the antenna 100 by an RF transmission line, such as a coaxial cable. As discussed with respect to FIG. 2A, the directional couplers DC are coupled to the calibration port 240-9 by multiple tiers of calibration combiners 212-214.

Moreover, the directional couplers DC are adjacent (e.g., in parallel with), and configured to tap RF energy from, respective paths RF of the calibration board 150 that are coupled between antenna signal ports 140 of the antenna 100 and respective columns 120 of radiating elements 130 (FIG. 1) of the antenna array 112 (FIG. 1). FIG. 2D illustrates connections via the calibration board 150 between two antenna signal ports 140-1, 140-8 of the antenna 100 and two columns 120, respectively. For simplicity of illustration, connections between the remaining six antenna signal ports 140-2 through 140-7 (FIG. 1) and the antenna array 112 are omitted from view in FIG. 2D.

As shown in FIG. 2D, the calibration board 150 includes an RF port 240-1 that is coupled between the antenna signal port 140-1 and a path RF-1 of the calibration board 150. The calibration board 150 also includes an RF port 240-11 that is coupled between the path RF-1 and a column 120 of radiating elements 130. Accordingly, the port 140-1 is coupled to the column 120 via the path RF-1. Moreover, the calibration board 150 includes an RF port 240-8 that is coupled between the antenna signal port 140-8 and a path RF-8 of the calibration board 150, and further includes an RF port 240-18 that is coupled between the path RF-8 and another column 120. The directional couplers DC-1, DC-8 are adjacent, and configured to tap RF energy from, the paths RF-1, RF-8, respectively.

In some embodiments, the ports 240-1, 240-8 may be first and second polarization ports, respectively, where the first and second polarizations are different polarizations. The ports 240-11, 240-18, which are coupled to the ports 240-1, 240-8 via the paths RF-1, RF-8, respectively, may thus also be first and second polarization ports, respectively. Each column 120 of the antenna array 112 may be coupled, via respective RF transmission lines (e.g., coaxial cables), to both a first-polarization port and a second-polarization port among the ports 240-11 through 240-18. In some embodiments, the columns 120 that are coupled to the ports 240-11, 240-18 shown in FIG. 2D may be the first and fourth columns 120-1, 120-4 (FIG. 1), respectively. In other embodiments, the ports 240-11, 240-18 may be coupled to the first and third columns 120-1, 120-3 (FIG. 1), respectively, or to the second and fourth columns 120-2, 120-4 (FIG. 1), respectively.

Figure 3:
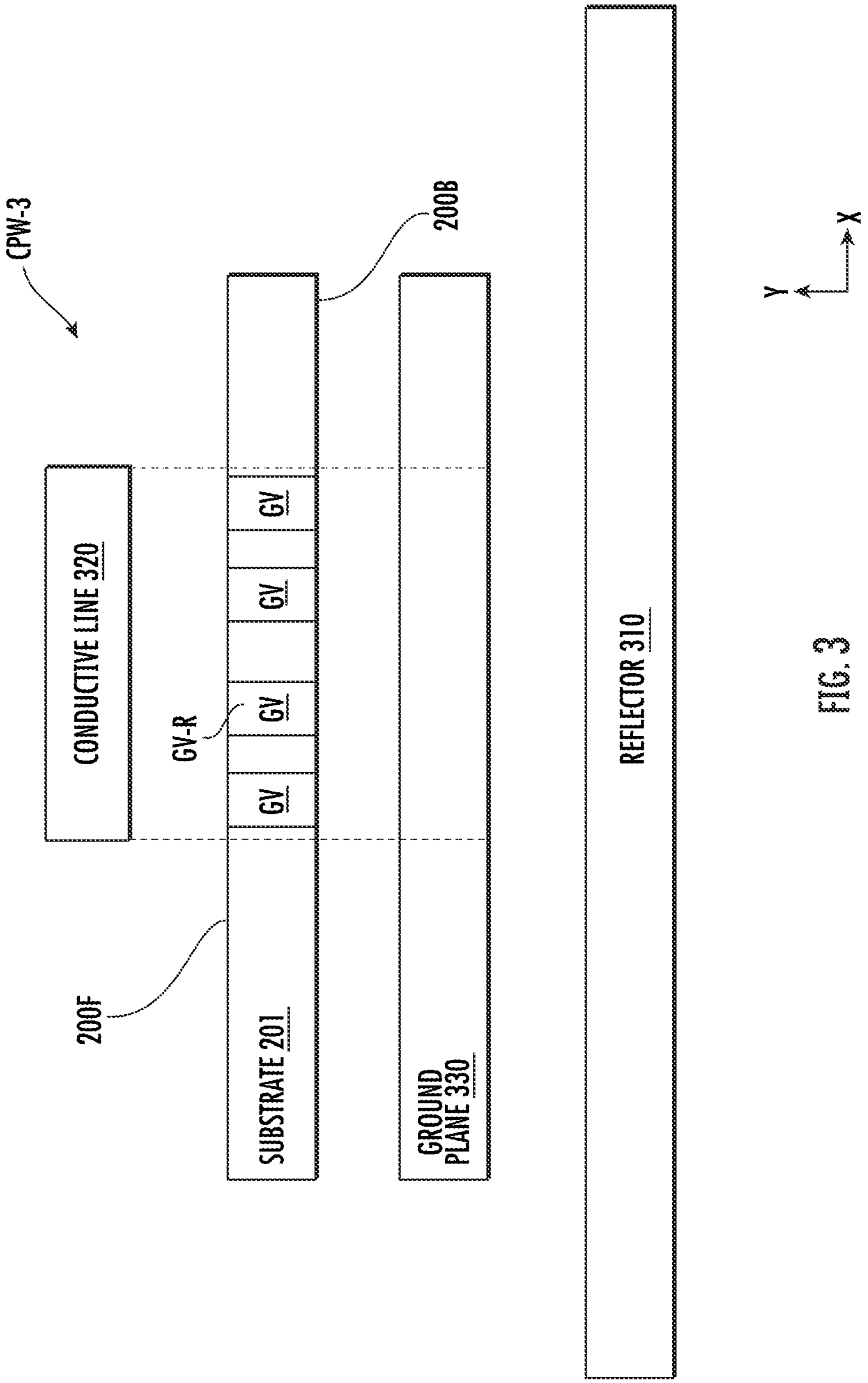
FIG. 3 is an exploded schematic cross-sectional view along a planar waveguide of FIG. 2B.

FIG. 3 is an exploded schematic cross-sectional view along the third grounded coplanar waveguide CPW-3 of FIG. 2B. As shown in FIG. 3, the coplanar waveguide CPW-3 includes a row GV-R of grounded vi as GAT and a conductive line 320 that overlaps the row GV-R. In some embodiments, the conductive line 320 may be a copper trace that is on a front surface 200F of the substrate 201 of the calibration board 150 (FIG. 2B).

FIG. 3 further illustrates that the coplanar waveguide CPW-3 is on a reflector 310 of the antenna 100 (FIG. 1). In some embodiments, the calibration board 150 may be on a back side of the reflector 310. In other embodiments, the calibration board 150 may be on a front side of the reflector 310. The radiating elements 130 (FIG. 1) of the antenna array 112 (FIG. 1) may also be mounted on the reflector 310 (e.g., on a front side thereof). Moreover, a ground plane 330 is between the reflector 310 and a back surface 200B the substrate 201 that is opposite the front surface 200F thereof. The reflector 310 thus faces the ground plane 330, which faces the back surface 200B of the substrate 201. The grounded vias GV extend in the substrate 201 to electrically connect the conductive line 320 to the ground plane 330. For example, the grounded vias may be in respective plated through holes ("PTH") that are in the substrate 201.

Though the cross-sectional view of FIG. 3 illustrates a single conductive line 320, the coplanar waveguide CPW-3 includes a plurality of (e.g., three) conductive lines 320 that are coplanar with (and spaced apart from) each other on the front surface 200F of the substrate 201. Similarly, the first and second grounded coplanar waveguides CPW-1, CPW-2 (FIG. 2B) each include a plurality of conductive lines 320 that are coplanar with each other, at least one of which is electrically connected to the ground plane 330 by grounded vias GV. The waveguides CPW-1 through CPW-3, however, are not limited to coplanar waveguides having three conductive lines 320, Rather, each of the waveguides CPW-1 through CPW-3 may more generally be a grounded planar waveguide, which may include a single conductive line 320 in some embodiments and multiple (e.g., three) coplanar conductive lines 320 in other embodiments.

In some embodiments, the calibration board 150 may be mounted directly on the reflector 310 without any other circuitry therebetween. In other embodiments, the calibration board 150 may be stacked on top of other circuitry that is inside the antenna 100 (FIG. 1). For example, the calibration board 150 may be on a mounting plate that is mounted above the other circuitry. A gap between the mounting plate and the other circuitry may reduce the risk of electrical interference between the calibration board 150 and the other circuitry. Moreover, by stacking the calibration board 150 on top of the other circuitry, the size of the reflector 310 can be reduced or space on the reflector 310 can be preserved for other purposes.

Calibration boards 150 according to embodiments of the present invention may provide a number of advantages. For example, compared with a uniform coupling line, a directional coupler DC that is on a calibration board 150 according to embodiments of the present invention may have a non-uniform coupling line, which can increase the directivity of the directional coupler DC. As an example, the non-uniform coupling line may include one (or two) of the tapered portions T1-T4 shown in FIG. 2B and/or one (or two) of the stepped portions ST1-ST4 shown in FIG. 2C, such that the coupling line has a non-uniform thickness in the direction Y between first and second sets of interdigitating teeth of a comb-line feature CL (FIG. 2B). A tapered coupler section TCS (FIG. 2A) is an example of a coupler section that has a non-rectangular interior shape that is defined by interior portions of a pair of adjacent non-uniform (e.g., not uniformly straight in the direction X) coupling lines of respective directional couplers DC that extend between a pair of RF transmission paths RF (FIG. 2A). As an example, the non-rectangular interior shape may be a hexagonal (or other polygonal) shape that is defined by the sloped surfaces S, as well as by surfaces V that may be straight in the direction Y. Such non-uniform coupling lines can improve the directivity of the directional couplers DC while maintaining sufficient coupling to tap RF energy from the paths RF for calibration purposes.

The directivity of a conventional coupled line may be higher than 10 decibels ("dB") over a wide band of 3.1-4.2 GHz. By contrast, the directivity of the directional couplers DC according to the present invention can exceed 15 dB throughout the wide band of 3.1-4.2 GHz. In some embodiments, the directivity may be highest in a range of 3.4-4 GHz (e.g., 3.7-4 GHz).

Return loss at RF ports 240-1 through 240-8 (FIG. 2A) of the calibration board 150 can improve, relative to a conventional calibration board, from a magnitude of 25 dB to a magnitude of greater than 35 dB (e.g., greater than 37 dB) over the wide band of 3.1-4.2 GHz. This improvement in return loss can improve impedance matching for the RF ports 240-1 through 240-8. For example, these improvements may result from (a) non-uniform coupler sections (e.g., the tapered coupler sections TCS) on the calibration board 150 and/or (b) grounded planar waveguides CPW (FIG. 2B) that are adjacent the ports 240-1 through 240-8.

Return loss can also improve at RF ports 240-11 through 240-18 (FIG. 2A) of the calibration board 150, relative to a conventional calibration board, from a magnitude of 25 dB to a magnitude of greater than 30 dB over the wide band of 3.1-4.2 GHz.

The amplitude difference between the ports 240-1 through 240-8 and the calibration port 240-9 (FIG. 2A) of the calibration board 150 can be +/−0.25 dB (or +/−0.15 dB or +/−0.2 dB) over the wide band of 3.1-4.2 GHz. By contrast, the amplitude difference for a conventional calibration board may be +/−0.5 dB. The calibration board 150 can thus significantly reduce the amplitude difference.

The calibration board 150 can also significantly reduce the phase difference between the ports 240-1 through 240-8 and the calibration port 240-9. For example, the phase difference can be +/−2 degrees (or +/−1.5 degrees) over the wide band of 3.1-4.2 GHz. By contrast, the phase difference for a conventional calibration board may be +/−5 degrees.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna comprising:

a plurality of radiating elements that are in a plurality of columns;

a calibration port; and a calibration board, wherein the calibration board comprises:

a plurality of directional couplers that are each coupled to the calibration port; and a plurality of radio frequency (RF) transmission paths that are coupled to the directional couplers, respectively, and to the columns, and wherein a first pair of the directional couplers, together, form a coupler section that is between and coupled to a first pair of the RF transmission paths and that comprises a closed non-rectangular interior shape, wherein each of the directional couplers in the first pair of the directional couplers has respective coupling lines that have a width that decreases from a first end to a middle and increases from the middle to an opposite second end.

2. The base station antenna of claim 1, wherein the non-rectangular interior shape comprises a plurality of tapered portions of the first pair of the directional couplers.

3. The base station antenna of claim 2, wherein the tapered portions comprise:

first and second tapered portions that are adjacent a first RF transmission path of the first pair of the RF transmission paths; and third and fourth tapered portions that are adjacent a second RF transmission path of the first pair of the RF transmission paths.

4. The base station antenna of claim 3, wherein the first and second tapered portions are mirror symmetrical.

5. The base station antenna of claim 4, wherein the third and fourth tapered portions are mirror symmetrical.

6. The base station antenna of claim 3, wherein the first and third tapered portions are mirror symmetrical.

7. The base station antenna of claim 6, wherein the second and fourth tapered portions are mirror symmetrical.

8. The base station antenna of claim 3, wherein the first and second tapered portions are tapered toward each other.

9. The base station antenna of claim 8, wherein the third and fourth tapered portions are tapered toward each other.

10. The base station antenna of claim 3, wherein at least one of the first, second, third, or fourth tapered portions is a stepped portion.

11. The base station antenna of claim 1, wherein the coupler section comprises a trace of the calibration board.

12. The base station antenna of claim 1, wherein the calibration board further comprises a grounded coplanar waveguide that is between the first pair of the RF transmission paths and adjacent a first end of the coupler section.

13. The base station antenna of claim 1, wherein the calibration board further comprises:

an RF port that is coupled to a first RF transmission path of the first pair of the RF transmission paths; and a grounded coplanar waveguide that extends alongside the RF port.

14. The base station antenna of claim 1, wherein the calibration board further comprises a plurality of calibration combiners that are coupled between the directional couplers and the calibration port, and wherein the coupler section of the first pair of the directional couplers is coupled to a first of the calibration combiners.

15. A base station antenna comprising:

an antenna array comprising a plurality of radiating elements;

a calibration port; and a calibration board, wherein the calibration board comprises:

a plurality of directional couplers that are coupled to the calibration port;

a plurality of radio frequency (RF) transmission paths that are coupled to the directional couplers, respectively, and to the antenna array;

a first grounded planar waveguide that is adjacent a first end of a first of the RF transmission paths;

a second grounded planar waveguide that is adjacent a first end of a second of the RF transmission paths; and a third grounded planar waveguide that is between the first and the second of the RF transmission paths and adjacent a first of the directional couplers.

16. The base station antenna of claim 15, wherein the first of the directional couplers has a tapered coupling line that is coupled to the first of the RF transmission paths, and wherein the first, second, and third grounded planar waveguides are first, second, and third grounded coplanar waveguides, respectively.

17. A base station antenna calibration board comprising:

a calibration port;

a plurality of directional couplers that are coupled to the calibration port; and a plurality of radio frequency (RF) transmission paths that are coupled to the directional couplers, respectively, wherein a first of the directional couplers comprises a first tapered portion that is coupled to a first of the RF transmission paths, wherein a second of the directional couplers comprises a second tapered portion that is coupled to a second of the RF transmission paths, and wherein the first tapered portion and the second tapered portion are opposite each other and form at least a portion of a closed interior shape between the first and the second of the RF transmission paths, wherein each of the first and second tapered portions is physically separated from each of the first and second RF transmission paths, respectively.

18. The base station antenna calibration board of claim 17, wherein the first of the directional couplers further comprises a third tapered portion that is tapered toward the first tapered portion and is coupled to the first of the RF transmission paths, wherein the second of the directional couplers further comprises a fourth tapered portion that is tapered toward the second tapered portion and is coupled to the second of the RF transmission paths, and wherein the third tapered portion and the fourth tapered portion are opposite each other between the first and the second of the RF transmission paths.

19. The base station antenna of claim 1, wherein the first pair of the directional couplers and the first pair of the RF transmission paths are coupled to each other via a comb-line feature.

20. The base station antenna of claim 1, wherein the first pair of the directional couplers and the first pair of the RF transmission paths are physically separated from each other.

* * * * *